US007221400B2

(12) United States Patent
Takahashi et al.

(10) Patent No.: US 7,221,400 B2

(45) Date of Patent: May 22, 2007

(54) SENSOR DEVICE FOR AUTOMATIC EXPOSURE AND AUTOMATIC FOCUS

(75) Inventors: Hidekazu Takahashi, Kanagawa (JP); Kazuhiro Saito, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 911 days.

(21) Appl. No.: 10/347,875

(22) Filed: Jan. 22, 2003

(65) Prior Publication Data

US 2003/0146995 A1 Aug. 7, 2003

(30) Foreign Application Priority Data

Jan. 31, 2002 (JP) ............................ 2002-023786

(51) Int. Cl.
*H04N 5/235* (2006.01)

(52) U.S. Cl. ...................................... 348/350; 348/362

(58) Field of Classification Search ................ 348/345, 348/362, 364, 349, 350, 352–356; 396/63, 396/96, 100, 121, 129, 213, 233

See application file for complete search history.

(56) References Cited

U.S. PATENT DOCUMENTS 5,302,997 A * 4/1994 Cocca ......................... 396/99
5,777,675 A * 7/1998 Miida et al. ................ 348/350
6,038,405 A 3/2000 Kageyama
6,215,961 B1 * 4/2001 Mukai et al. ............... 396/100
6,226,459 B1 * 5/2001 Hamada et al. ............... 396/54
6,973,265 B2 * 12/2005 Takahashi ................... 396/121
2003/0108345 A1 * 6/2003 Yoshida et al. ............. 396/104
2003/0160887 A1 * 8/2003 Takahashi ................... 348/350

FOREIGN PATENT DOCUMENTS

JP 01 288834 11/1989
JP 07 325248 12/1995
JP 08 210921 8/1996
JP 08 313796 11/1996

* cited by examiner

*Primary Examiner*—Tuan Ho
*Assistant Examiner*—Timothy J. Henn
(74) *Attorney, Agent, or Firm*—Fitzpatrick, Cella, Harper & Scinto

(57) ABSTRACT

An image pickup apparatus including a first photoelectric conversion circuit that has a photoelectric conversion area and is used for performing focus adjustment; a second photoelectric conversion circuit that has a photoelectric conversion area and is used for performing exposure amount adjustment; and a control circuit for controlling a power supply such that power is supplied to the first photoelectric conversion circuit and the second photoelectric conversion circuit independently, in which the first photoelectric conversion circuit and the second photoelectric conversion circuit are formed on a same semiconductor substrate.

11 Claims, 14 Drawing Sheets

| FIG. 1A | FIG. 1B |
|---|---|

BASE LENGTH D
100
101
102
103
104
105
106
AE CIRCUIT
ANALOG CIRCUIT
DIGITAL CIRCUIT
A1
A2
A3
A4
A5
A6
A7
L1A
L2A
L3A
L4A
L5A
L6A
L7A
L1B
L2B
L3B
L4B
L5B
L6B
L7B
W1
W2
W3
W4
M1
M2
M3
M4
T1
S1
S2
S3
S4
S5
S6
S7

| FIG. 3A | FIG. 3B |
| --- | --- |

| FIG. 8A | FIG. 8B |
|---|---|

SENSOR DEVICE FOR AUTOMATIC EXPOSURE AND AUTOMATIC FOCUS

BACKGROUND OF THE INVENTION

1. Field of the Invention

The present invention relates to an image pickup apparatus having a photoelectric conversion function.

2. Related Background Art

FIG. 11 is a block diagram showing an example of an autofocus (AF) sensor circuit for multipoint distance measurement which is used in a conventional single-lens reflex camera. An AF sensor using this AF sensor circuit was published by the inventors of this application in the Institute of Image Information and Television Engineers Technical Report Vol. 25, No. 28, pp. 1 to 6, March 2001. In FIG. 11, reference numeral 900 denotes a semiconductor chip (semiconductor substrate); 901, an AF sensor circuit block; 902, an analog circuit block; and 903, a digital circuit block.

In this AF sensor, the AF sensor circuit block 901 is composed of eight linear sensor circuits 1A (1B) to 8A (8B) to enable seven-point distance measurement (cross distance measurement in the center). The analog circuit block 902 is composed of AGC circuits 1 to 8 for controlling accumulation time of each linear sensor circuit, a signal amplifying circuit 902A for amplifying a signal from the AF sensor circuit block 902 to output the signal, a band gap circuit (reference voltage generation circuit) 902B for generating a reference voltage, and an intermediate voltage generation circuit 902C for generating voltages required in sensor circuits and analog circuits.

The digital circuit block 903 consists of an input/output communication circuit (I/O) for communicating with a microcomputer, a timing generator circuit (T/G) for generating a drive pulse of a sensor, and a multiplexer circuit (MPX) for selecting various analog signals. Since high-speed autofocus is required in a single-lens reflex camera, an AF sensor realizes a high-speed operation by driving the eight linear sensor circuits and the AGC circuits in parallel.

However, in the above-mentioned conventional autofocus sensor, current consumption in operation is increased by driving each circuit simultaneously. Although a significant problem is not caused in a single-lens reflex camera because a battery with a large current capacity can be mounted thereon, since only a battery with a small current capacity can be mounted on a compact camera, a battery life of the compact camera is extremely reduced.

In addition, AE and AF in the compact camera are those of an external measurement system unlike a TTL system of the single-lens reflex camera. Thus, an unnecessary AF sensor circuit may operate depending upon a zoom range of a photographing lens used in the compact camera (a distance measurement point of an AF sensor is located outside a photographing range).

SUMMARY OF THE INVENTION

An object of the present invention is to reduce current consumption.

In order to attain the above-mentioned object, according to an aspect of the present invention, there is provided an image pickup apparatus comprising:

a first photoelectric conversion circuit that has a photoelectric conversion area and is used for performing focus adjustment;

a second photoelectric conversion circuit that has a photoelectric conversion area and is used for performing exposure amount adjustment; and a control circuit for controlling a power supply such that power is supplied to the first photoelectric conversion circuit and the second photoelectric conversion circuit independently, in which the first photoelectric conversion circuit and the second photoelectric conversion circuit are formed on the same semiconductor substrate.

Further, according to another aspect of the present invention, there is provided an image pickup apparatus comprising:

first and second photoelectric conversion circuits, each of which includes a photoelectric conversion area; and a control circuit which, according to an operation of a zoom lens for magnifying and reducing an object image to be picked up, switches between a mode in which power is not supplied to the first photoelectric conversion circuit and power is supplied to the second photoelectric conversion circuit and a mode in which power is supplied to the first and second photoelectric conversion circuits.

Further, according to still another aspect of the present invention, there is provided an image pickup apparatus comprising:

first and second photoelectric conversion circuits, each of which includes a photoelectric conversion area and a logarithmic compression circuit;

third and fourth photoelectric conversion circuits provided on one side of the first and second photoelectric conversion circuits, each of which has a plurality of photoelectric conversion areas and a reading-out circuit for reading out peak signals of the plurality of photoelectric conversion areas;

fifth and sixth photoelectric conversion circuits provided on the other side of the first and second photoelectric conversion circuits, each of which has a plurality of photoelectric conversion areas and a reading-out circuit for reading out peak signals of the plurality of photoelectric conversion areas; and a control circuit for controlling a power supply such that power is not supplied to the first, third, and fifth photoelectric conversion circuits and power is supplied to the second, fourth, and sixth photoelectric conversion circuits, in which the first to sixth photoelectric conversion circuits are formed on the same semiconductor substrate.

Further, according to yet still another aspect of the present invention, there is provided an image pickup apparatus comprising:

a first photoelectric conversion circuit including a photoelectric conversion area and a logarithmic compression circuit;

a second photoelectric conversion circuit that is provided on one side of the first photoelectric conversion circuit and has a plurality of photoelectric conversion areas and a reading-out circuit for reading out peak signals of the plurality of photoelectric conversion areas; and a control circuit for controlling a power supply such that power is supplied to the first photoelectric conversion circuit and the second photoelectric conversion circuit independently, in which the first and second photoelectric conversion circuits are formed on the same semiconductor substrate.

DETAILED DESCRIPTION OF THE PREFERRED EMBODIMENTS

Embodiments of the present invention will be hereinafter described in detail with reference to the accompanying drawings.

First Embodiment

Figures 1, 1A:
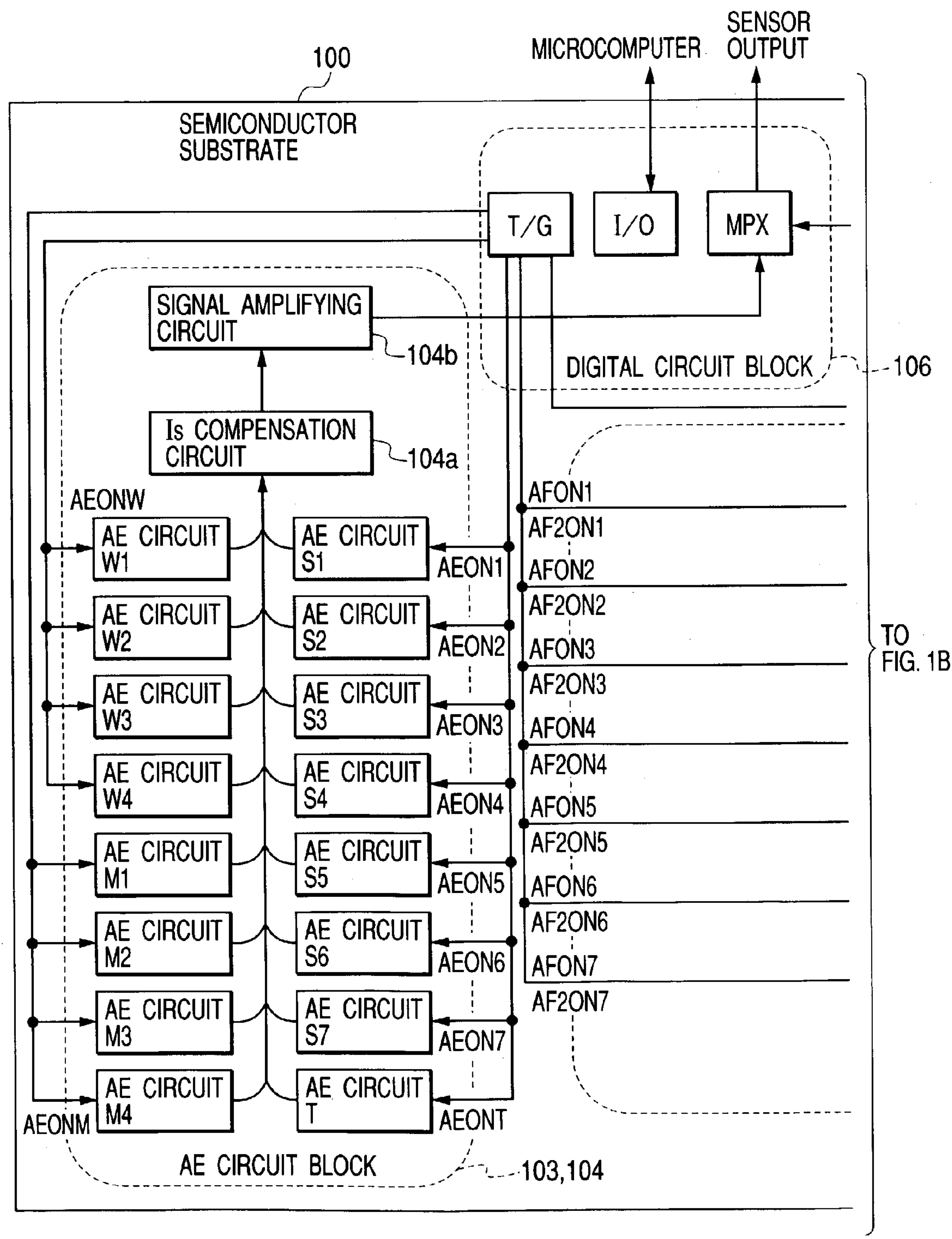
FIG. 1 is comprised of FIGS. 1A and 1B illustrating block diagrams showing a structure of a first embodiment of a solid-state image pickup apparatus for photometry and distance measurement according to the present invention.
Figure 1B:
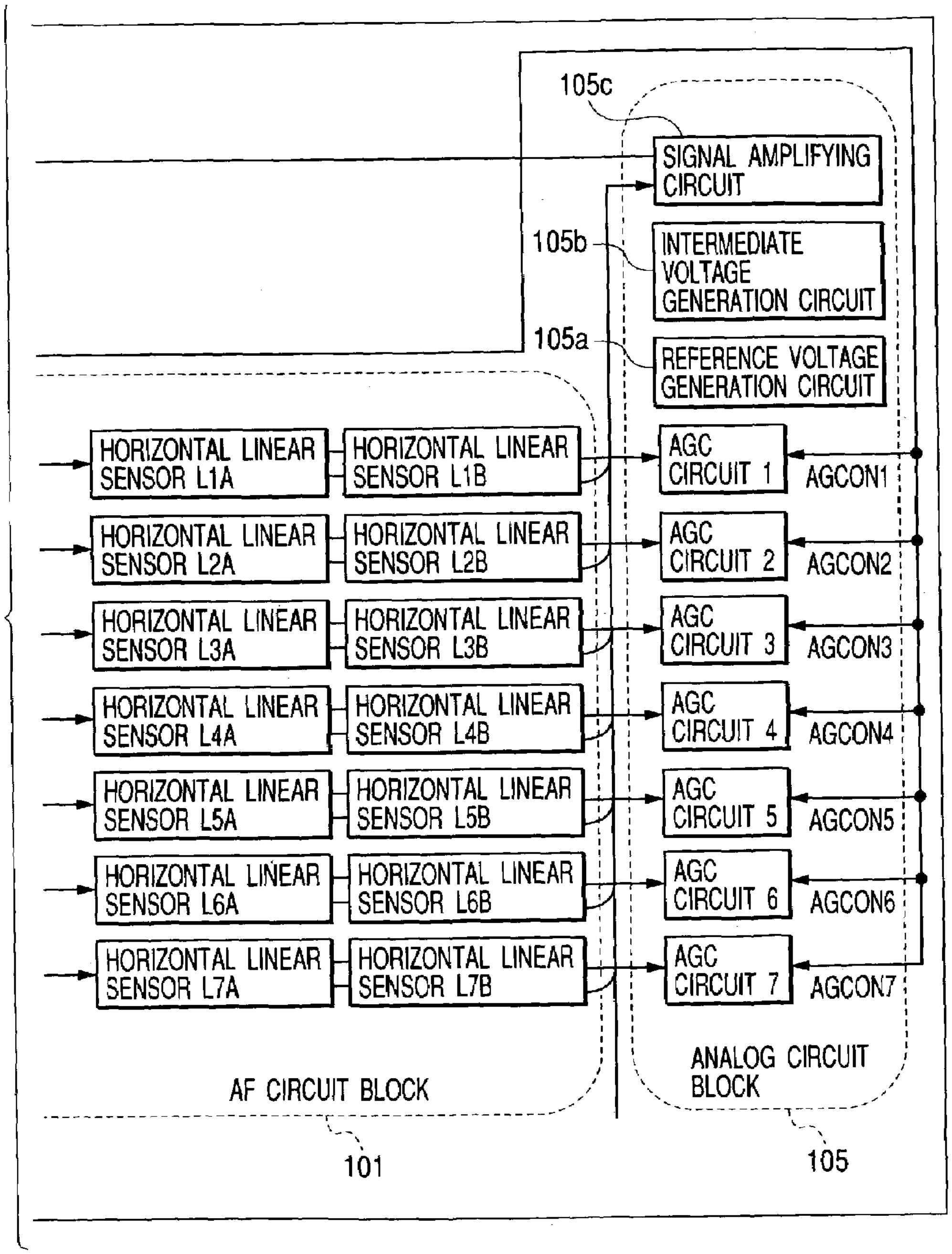
Figure 2:
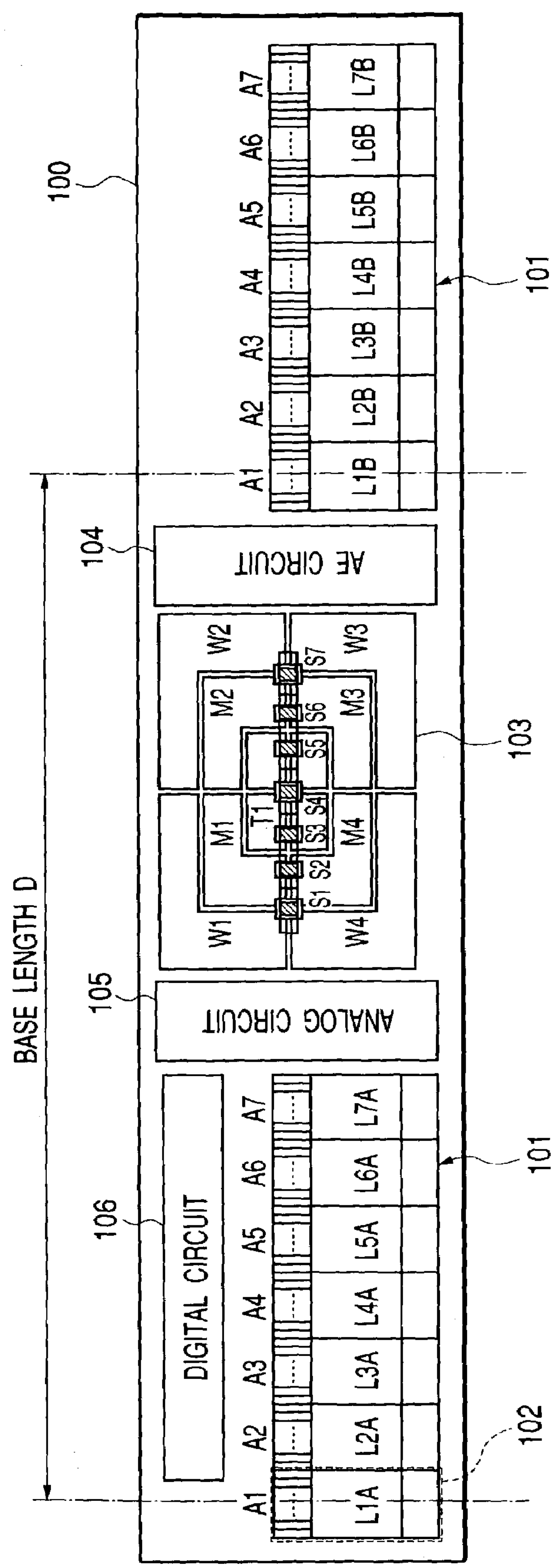
FIG. 2 is a layout plan view of the first embodiment of the present invention.

FIGS. 1A and 1B are block diagrams showing a structure of a first embodiment of a solid-state image pickup apparatus for photometry and distance measurement of the present invention. FIG. 2 is a layout plan view of the solid-state image pickup apparatus of the first embodiment. The solid-state image pickup apparatus for photometry and distance measurement of this embodiment is provided with a photometry function (function for exposure amount adjustment) in addition to a distance measurement function (function for focus adjustment). In these figures, reference numeral 100 denotes a semiconductor chip (semiconductor substrate); 101, an AF sensor circuit block that has a photoelectric conversion area and is used for performing focus adjustment; 103 and 104, an AE sensor circuit block that has a photoelectric conversion area and is used for performing exposure amount adjustment; 105, an analog circuit block; and 106, a digital circuit block. These blocks are integrated on the semiconductor chip 100.

The AF sensor circuit block 101 is composed of seven pairs of AF sensor circuits 102. As shown in FIGS. 1A and 1B, the seven pairs of AF sensor circuits 102 are constituted by seven pairs of horizontal linear sensors of horizontal linear sensors L1A and L1B as one pair, and in the same manner, horizontal linear sensors L2A and L2B, L3A and L3B, L4A and L4B, L5A and L5B, L6A and L6B, and L7A and L7B.

As shown in FIG. 2, the AF sensor circuit block 101 is arranged on both sides of the semiconductor chip 100 of a substantially rectangular shape, and one horizontal linear sensor of FIGS. 1A and 1B corresponds to one AF sensor circuit 102 of FIG. 2. That is, the horizontal linear sensors L1A to L7A of FIGS. 1A and 1B correspond to the seven AF censor circuits 102 on the left side in FIG. 2, respectively, and the horizontal linear sensors L1B to L7B of FIGS. 1A and 1B correspond to the seven AF sensor circuits 102 on the right side in FIG. 2, respectively. The respective AF sensor circuits 102 include a photodiode. Symbols A1 to A7 in the left and right of FIG. 2 each denote this photodiode.

The AE sensor photodiode area 103 and the AE sensor circuit block 104 are shown as one block in FIGS. 1A and 1B. However, as shown in FIG. 2, the AE sensor photodiode area 103 is arranged in the central part of the semiconductor chip 100, and the AE sensor circuit block 104 is arranged next to the AE sensor photodiode area 103. As shown in FIG. 2, the AE sensor photodiode area 103 is divided into sixteen areas and constituted by seven photodiodes for spot photometry S1 to S7, four photodiodes for wide-angle photometry W1 to W4, four photodiodes for normal photometry M1 to M4, and one photodiode for telephotographic photometry T.

Here, as shown in FIGS. 1A and 1B, the AE sensor circuit block 104 includes AE sensor circuits S1 to S7, AE sensor circuits W1 to W4, AE sensor circuits M1 to M4, and an AE sensor circuit T. All of these are current/voltage logarithmic transformation type AE sensor circuits. In addition, among these AE sensor circuits, the AE sensor circuits S1 to S7 correspond to the photodiodes S1 to S7 of the AE sensor photodiode area 103 of FIG. 2, respectively, the AE sensor circuits W1 to W4 correspond to the photodiodes W1 to W4, respectively, the AE sensor circuits M1 to M4 correspond to the photodiodes M1 to M4, respectively, and the AE sensor circuit T corresponds to the photodiode T. In addition, the AE sensor circuit block 104 includes an Is (diode reverse current) compensation circuit 104*a* and a signal amplifying circuit 104*b*.

The analog circuit block 105 is arranged next to the AE sensor photodiode area 103 as shown in FIG. 2, and is composed of AGC circuits 1 to 7 for controlling an accumulation time of each of the AF sensor circuits 102, a band gap circuit (reference voltage generation circuit) 105*a* for generating a reference voltage, an intermediate voltage generation circuit 105*b* for generating an intermediate voltage, and a signal amplifying circuit 105*c* for amplifying an output from the AF sensor circuits.

The digital circuit block 106 is arranged next to the analog circuit block 105 as shown in FIG. 2, and is composed of an input/output communication circuit (I/O) for communicating with a microcomputer (not shown), an AF sensor circuit, an AE sensor circuit, a timing generator circuit (T/G) for generating a drive pulse for each of the AGC circuits, and a multiplexer circuit (MPX) for selecting various analog signals. Operation and non-operation of the AF sensor circuit, the AE sensor circuit, and the AGC circuit are controlled by a control signal from the T/G circuit under control of the microcomputer as described later in detail.

Figures 3, 3A:
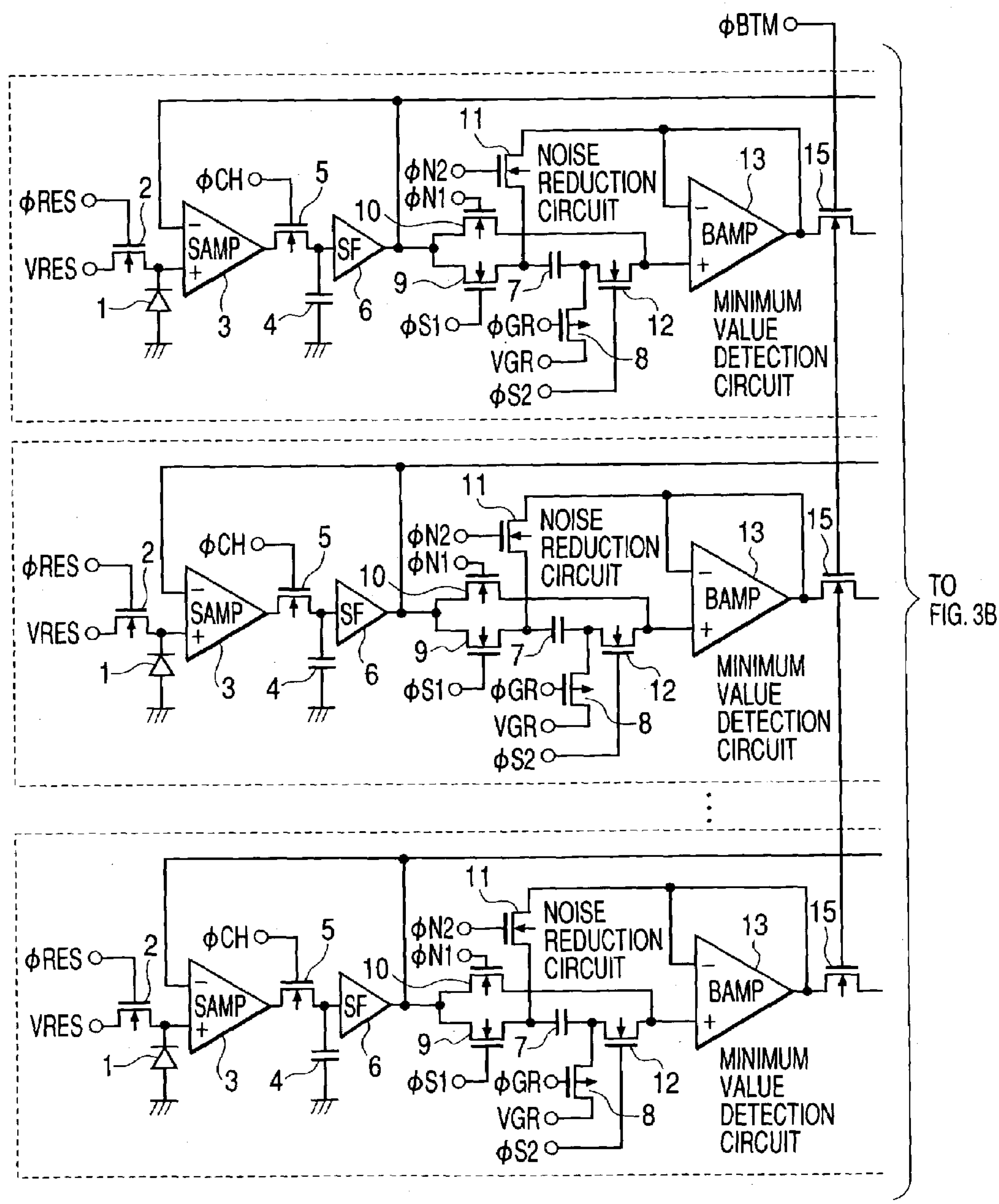
FIG. 3 is comprised of FIGS. 3A and 3B illustrating a circuit diagram showing an AF sensor circuit of the first embodiment.
Figure 3B:
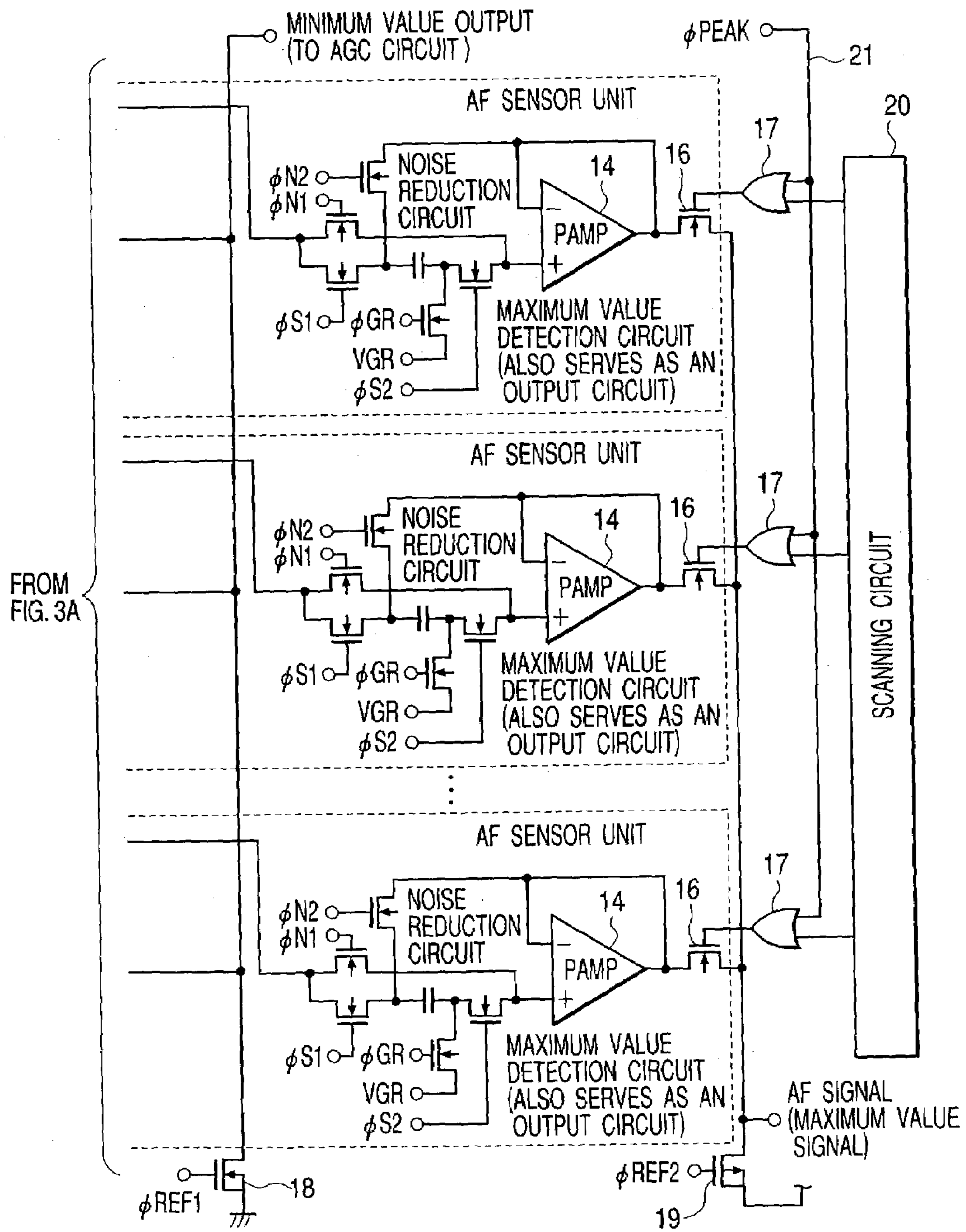

FIGS. 3A and 3B show specific circuit diagrams of the AF sensor circuits 102 of FIGS. 1A and 1B. In the figure, reference numeral 1 denotes PN junction photodiodes for performing photoelectric conversion; 2, reset MOS transistors for resetting potentials of the PN junction photodiodes to VRES; 3, differential amplifying circuits for amplifying charges generated in the PN junction photodiodes; 4, MOS capacitors for memorizing output voltages of the differential amplifying circuits 4; 5, MOS transistors for memory switches; and 6, source follower circuits for amplifying and reading out charges held in the MOS capacitors 4. It becomes possible to suppress offset variation and gain drop of output voltages by feeding back outputs of the source follower circuits 6 to the differential amplifying circuits 3.

Reference numeral 7 denotes clamp capacitors and 8 denotes MOS switches for inputting clamp potentials. Clamp circuits are constituted by the clamp capacitors 7 and the MOS switches 8. Reference numerals 9 to 12 denote switching MOS transistors; 13, minimum value detection differential amplifiers (minimum value detection circuits); and 14, maximum value detection differential amplifiers (maximum value detection circuits). Voltage follower circuits are constituted by the respective differential amplifiers. Reference numeral 15 denotes minimum value output MOS switches; 16, maximum value output MOS switches; 17, OR gates; 18 and 19, constant-current MOS transistors; and 20, a scanning circuit. A source follower circuit with NMOS in a final stage is used in the minimum value detection circuits 13, and a source follower circuit with PMOS in a final stage is used in the maximum value detection circuits 14. Reference numeral 21 denotes a common output line through which an AF signal from a pixel is outputted.

In this circuit configuration, it is possible to eliminate a reset noise generated in the photodiode and FPN generated in the sensor amplifier, the maximum value detection circuit, and the minimum value detection circuit by providing noise clamp circuits of a feedback type in pre-stages of the minimum value detection circuits 13 and the maximum value detection circuits 14.

In addition, a minimum value of a video signal can be obtained by providing a voltage follower circuit of a source follower type for each pixel in a final output stage, and turning off a constant-current source of an output stage of each voltage follower at the time of output of maximum value to commonly connect the voltage follower circuits to an output line connected to the constant-current source. In addition, a serial video signal can be obtained by turning on the constant-current source of the output stage of each voltage follower at the time of output of AF signal to connect the voltage follower circuits sequentially to the output line. According to this operation, since the maximum value detection circuit also serves as an AF image signal output circuit, it becomes possible to miniaturize a chip.

Figure 4A:
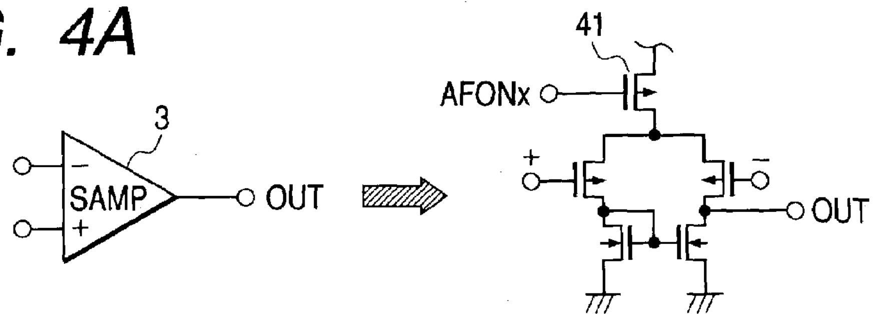
FIGS. 4A, 4B, 4C and 4D are diagrams for explaining operation and non-operation of the AF sensor circuit of the first embodiment.
Figure 4B:
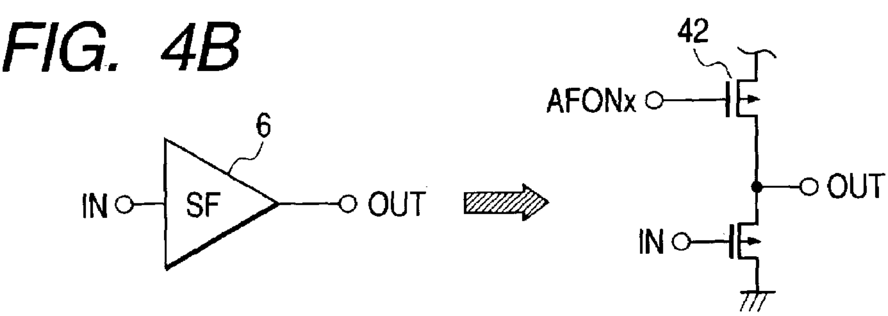
Figure 4C:
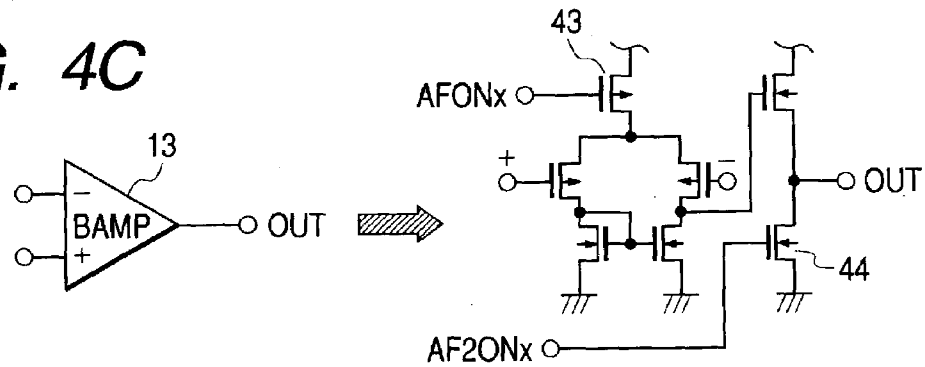
Figure 4D:
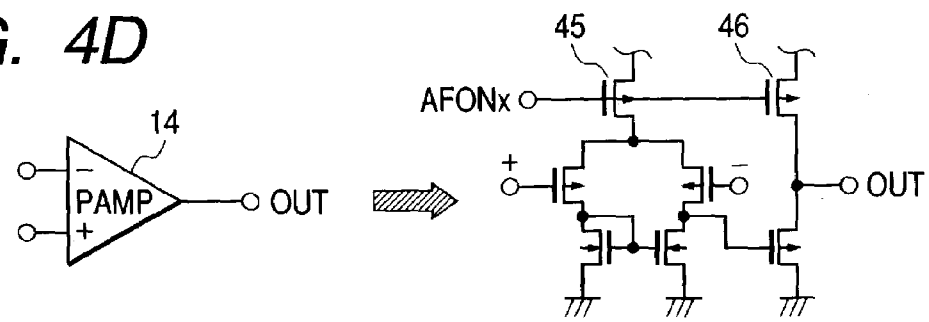

FIGS. 4A to 4D show specific circuit diagrams of a differential amplifying circuit of a pixel portion, a source follower circuit, a differential amplifying circuit of the maximum value detection circuit, and a differential amplifying circuit of the minimum value detection circuit in the AF sensor circuit. FIG. 4A is a circuit diagram of the differential amplifying circuit of the pixel portion (corresponding to the differential amplifying circuit 3 of FIGS. 3A and 3B), FIG. 4B is a circuit diagram of the source follower circuit 6, FIG. 4C is a circuit diagram of the minimum value detection circuit 13, and FIG. 4D is a circuit diagram of the maximum value detection circuit 14.

In addition, a specific circuit configuration of each circuit is shown in FIGS. 4A to 4D. An MOS transistor is used in all the circuits. Reference numerals 41 to 46 in each circuit of FIGS. 4A to 4D denote MOS transistors to be constant-current sources. In this embodiment, at the time of operation of the AF sensor circuit, the MOS transistors are used as the constant-current sources by applying a signal for operating the MOS transistors within a linear operation range to gate. In addition, at the time of non-operation of the AF sensor circuit, a bias current is turned off by applying a signal for cutting off the MOS transistors to the gate.

More specifically, a control signal to be applied to the gates is generated in the T/G circuit according to communication from the microcomputer, and control signals AFON1 to AFON7 and control signals AF2ON1 to AF2ON7 shown in FIGS. 1A and 1B are supplied to corresponding AF sensor circuits, respectively. The AF sensor circuit is brought into an operating state by applying a control signal (intermediate level signal) for operating the MOS transistors 41 to 46, which constitute the constant-current source as described above, within the linear operation range, to the respective gates of the MOS transistors 41 to 46.

On the other hand, the AF sensor circuit is brought into a non-operating state by applying a control signal (in the case of AFON1 to AFON7, a VDD level signal (power source level signal), and in the case of AF2ON1 to AF2ON7, a GND level signal) for cutting off the MOS transistors 41 to 46, to the respective gates of the MOS transistors 41 to 46. Note that the control signals AF2ON1 to AF2ON7 are supplied to all the circuits of FIGS. 4A to 4D, and the control signals AF2ON1 to AF2ON7 are supplied to the circuit of FIG. 4C only.

Figure 5:
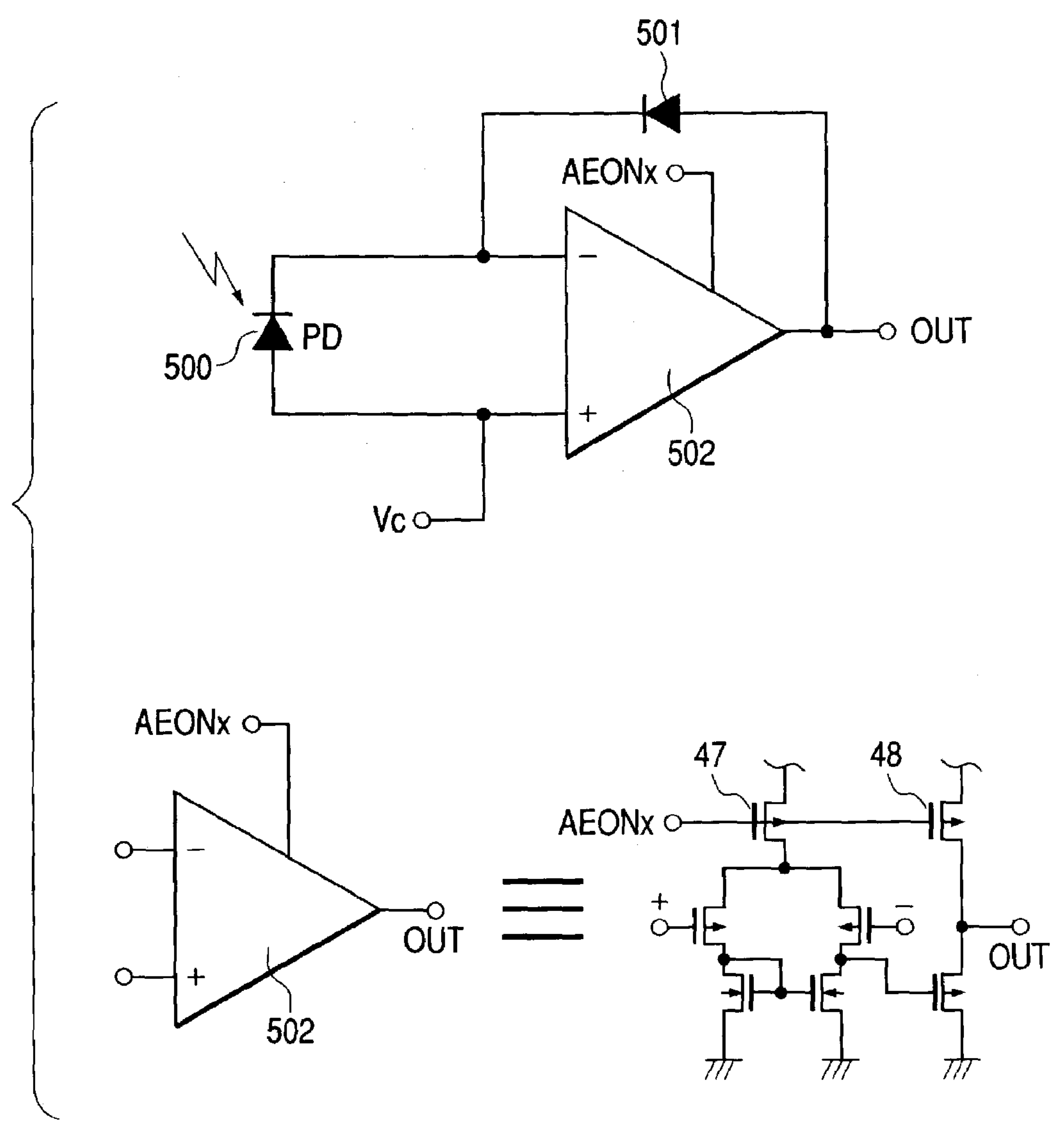
FIG. 5 is a circuit diagram showing an AE sensor circuit of the first embodiment.

FIG. 5 shows a specific example of a logarithmic transformation type AE sensor circuit (including a photodiode). This corresponds to all AE sensor circuits including the AE sensor circuits S1 to S7 of FIGS. 1A and 1B. In FIG. 5, reference numeral 500 denotes a PN junction photodiode; 501, a PN junction diode functioning as a nonlinear element for performing logarithmic compression; and 502, a differential amplifying circuit of CMOS structure. In addition, in FIG. 5, a specific circuit configuration of the differential amplifying circuit 502 is also shown. The differential amplifying circuit 502 is constituted using MOS transistors, and among the MOS transistors, those denoted by 47 and 48 are PMOS transistors to be constant-current sources.

By controlling the MOS transistors 47 and 48, operation and non-operation of the AE sensor circuits are controlled. More specifically, as shown in FIGS. 1A and 1B, control signals AEON1 to AEON7, AEONT, AEONW, and AEONM are supplied to corresponding AE sensor circuits, respectively, from the T/G circuit based on control of the microcomputer. The control signals AEON1 to AEON7 correspond to the AE sensor circuits S1 to S7, respectively, the control signal AEONT corresponds to the AE sensor circuit T, the control signal AEONW corresponds to the four AE sensor circuits W1 to W4, and the control signal AEONM corresponds to the four AE sensor circuits M1 to M4.

Here, at the time of non-operation of the AE sensor circuit, the MOS transistors 47 and 48 are turned off by applying a control signal of a VDD level (power source level) to respective gates of the MOS transistors 47 and 48, and the AE sensor circuits are brought into a non-operating state by turning off a bias current of the differential amplifying circuit 502. In addition, at the time of operation of the AE sensor circuits, the AE sensor circuits are brought into an operating state by applying a control signal (intermediate level signal) for causing the MOS transistors 47 and 48 to operate within a linear operation range, to the respective gates of the MOS transistors 47 and 48.

Figure 6A:
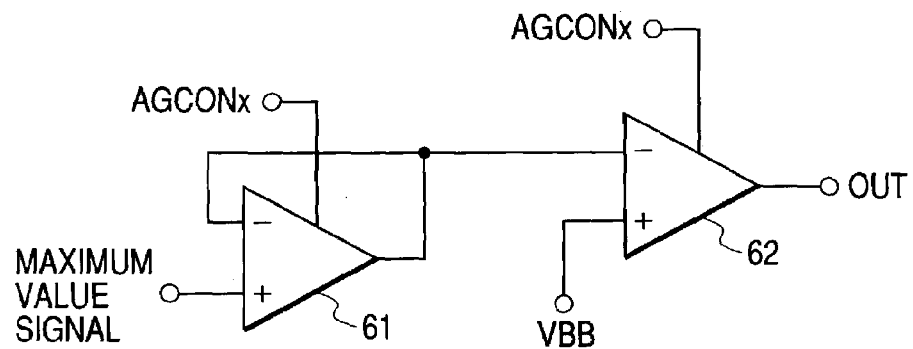
FIGS. 6A, 6B and 6C are diagrams showing an AGC circuit of the first embodiment.

FIG. 6A shows a specific circuit diagram of an AGC circuit. In the figure, reference numeral 61 denotes a voltage buffer circuit and 62 denotes a comparator circuit. As shown in FIGS. 1A and 1B, AGC circuits are provided correspondingly to the AF sensor circuits 102 of the AF sensor circuit block 101, and AGC circuits 1 to 7 are provided correspondingly to a pair of horizontal linear sensors L1A and L1B to a pair of horizontal linear sensors L7A and L7B, respectively.

In each AGC circuit, a maximum value signal from a corresponding AF sensor circuit is impedance-converted in the voltage buffer circuit 61 and, thereafter, is compared with a comparison voltage VBB in the comparator circuit 62. Then, output of the comparator circuit 62 is reversed when the maximum value signal from the AF sensor circuit exceeds the comparison voltage VBB, and accumulation in the photodiode of the AF sensor circuit is finished.

Figure 6B:
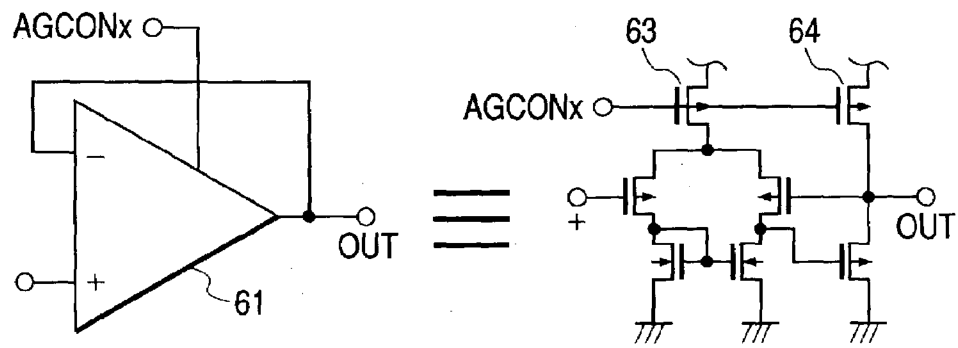
Figure 6C:
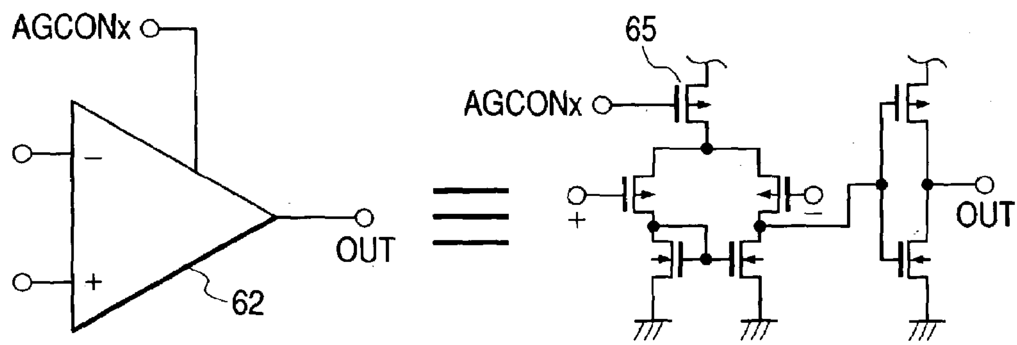

FIG. 6B shows a specific circuit configuration of the voltage buffer circuit 61, and FIG. 6C shows a specific circuit configuration of the comparator circuit 62. Reference numerals 63 and 64 denote constant-current MOS transistors of the voltage buffer circuit 61, and 65 denotes a constant-current MOS transistor of the comparator circuit 62. Operation and non-operation of the AGC circuit are controlled according to control signals AGCON1 to AGCON7 from the T/G circuit. As shown in FIGS. 1A and 1B, the control signals AGCON1 to AGCON7 correspond to the AGC circuits 1 to 7, respectively.

At the time of operation of the AGC circuit, the constant-current MOS transistors 63 to 65 are operated as constant-current sources by applying a control signal of an intermediate level from the T/G circuit to respective gates of the constant-current MOS transistors 63 to 65. On the other hand, at the time of non-operation of the AGC circuit, the constant-current MOS transistors 63 to 65 are brought into a current-off state by applying a control signal of a VDD level (power source level) from the T/G circuit to the respective gates of the constant-current MOS transistors 63 to 65. Operation and non-operation of the AGC circuit are controlled in association with operation and non-operation of the AF sensor circuit, and current consumption is reduced by operating only the AGC circuit corresponding to an operated AF sensor circuit.

As described above, biases of the AF sensor circuit and the AE sensor circuit are controlled independently by the T/G circuit functioning as a control circuit. In addition, biases of the AF sensor circuit, the AE sensor circuit, and the AGC circuit are controlled independently by the T/G circuit functioning as a control circuit.

Figure 7A:
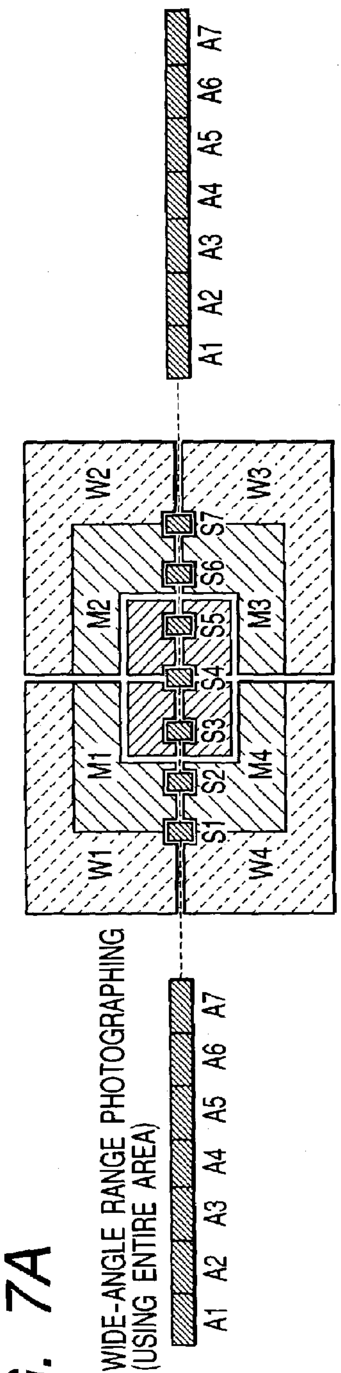
FIGS. 7A, 7B and 7C are diagrams for explaining a relationship between zoom ranges at photographing time and operating AE sensor circuits and AF sensor circuits of the first embodiment.
Figure 7B:
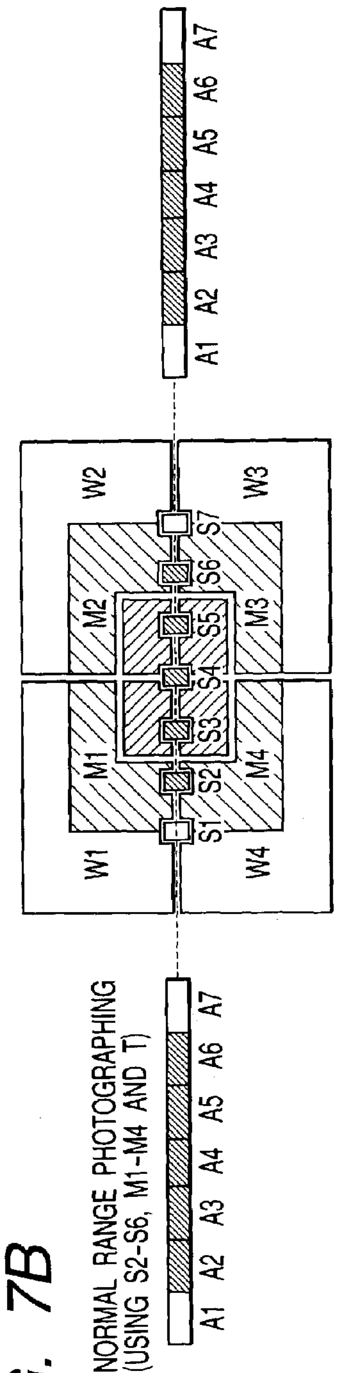
Figure 7C:
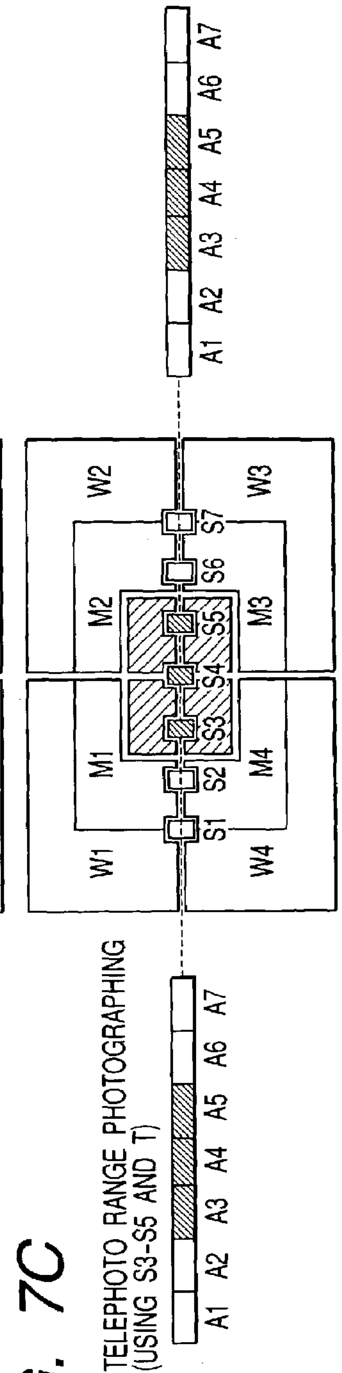

Next, a relationship between zoom ranges (wide-angle range, normal range, and telephoto range) in actual photographing and operated AF sensor circuits and AE sensor circuits will be described. Table 1 shows a relationship between the zoom ranges and the operated AF sensor circuits, and Table 2 shows a relationship between the zoom ranges and the operated AE sensor circuits. In addition, FIGS. 7A to 7C show a relationship between zoom ranges and operated AF sensors and AE sensors. FIG. 7A shows a sensor that operates at the time of wide-angle range photographing, FIG. 7B shows a sensor that operates at the time of normal range photographing, and FIG. 7C shows a sensor that operates at the time of telephoto range photographing. Note that, in Tables 1 and 2, checked circuits are circuits in which a bias is turned on, and in FIGS. 7A to 7C, circuits in the photodiode areas indicated by slanted lines are circuits in which a bias is turned on.

TABLE 1

| | AF Sensor | | | | | | |
|---|---|---|---|---|---|---|---|
| Zoom ranges | L1 | L2 | L3 | L4 | L5 | L6 | L7 |
| (1) Wide-angle range | ○ | ○ | ○ | ○ | ○ | ○ | ○ |
| (2) Normal range | — | ○ | ○ | ○ | ○ | ○ | — |
| (3) Telephoto range | — | — | ○ | ○ | ○ | — | — |

TABLE 2

| | AE Sensor | | | | | | | | | |
|---|---|---|---|---|---|---|---|---|---|---|
| Zoom ranges | S1 | S2 | S3 | S4 | S5 | S6 | S7 | W1,W2,W3,W4 | M1,M2,M3,M4 | T |
| (1) Wide-angle range | ○ | ○ | ○ | ○ | ○ | ○ | ○ | ○ | ○ | ○ |
| (2) Normal range | — | ○ | ○ | ○ | ○ | ○ | — | — | ○ | ○ |
| (3) Telephoto range | — | — | ○ | ○ | ○ | — | — | — | — | ○ |

First, in the case of the wide-angle range photographing of FIG. 7A, all the AE sensors (sixteen points of S1 to S7, W1 to W4, M1 to M4, and T) are operated to perform photometry as shown in Table 2, and all AF sensors (seven points of L1 to L7) are operated to perform distance measurement as shown in Table 1. Note that the AF sensors L1 to L7 refer to the respective pairs of the horizontal linear sensors from L1A and L1B to L7A and L7B shown in FIGS. 1A and 1B.

In the case of the normal range photographing of FIG. 7B, only the AE sensors of S2 to S6, M1 to M4, and T (ten areas) and the AF sensors of L2 to L6 (five points) are operated to perform photometry and distance measurement. The other AF sensors and AE sensors are brought into the non-operating state. Note that the AF sensors L2 to L6 refer to the respective pairs of horizontal linear sensors from L2A and L2B to L6A and L6B.

In the case of the telephoto range photographing of FIG. 7C, only the AE sensors of S3 to S5 and T (four areas) and the AF sensors of L3 to L5 (three points) are operated to perform photometry and distance measurement. The other AF sensors and AE sensors are brought into the non-operating state. In addition, similarly, the AF sensors L3 to L5 refer to the respective pairs of horizontal linear sensors from L3A and L3B to L5A and L5B. The same applies to the embodiments described below.

The selection of the AF sensors in these zoom ranges is performed according to a control signal from the T/G circuit under the control of the microcomputer as illustrated in FIGS. 4A to 4D. For example, in the case of the wide-angle range photographing, a signal (intermediate level signal) for linearly operating the MOS transistors constituting the constant-current sources is applied to all the AF sensor circuits, whereby all the AF sensor circuits are operated to perform distance measurement.

In addition, the selection of the AE sensors is also performed according to a control signal from the T/G circuit as illustrated in FIG. 5. For example, in the case of the wide-angle range photographing, a control signal (intermediate level signal) for linearly operating the MOS transistors constituting the constant-current sources is applied to all the AE sensor circuits as described above, whereby all the AE sensor circuits are operated to perform photometry. Further, as illustrated in FIGS. 6A to 6C, only the AGC circuits corresponding to the operated AF sensor circuits are operated according to a control signal from the T/G circuits and the AGC circuits corresponding to the non-operating AF sensor circuits are brought into the non-operating state, thereby performing the selection of the AGC circuits. In the case of the wide-angle range photographing, since all the AF sensor circuits operate, all the AGC circuits are operated.

As described above, in this embodiment, only the necessary AF sensor circuits and AE sensor circuits among the plurality of AF sensor circuits and AE sensor circuits are brought into the operating state, and the other AF sensor circuits and AE sensor circuits are brought into the non-operating state by turning off the constant-current sources thereof, whereby current consumption can be reduced significantly. In addition, since the current consumption can be reduced, it becomes possible to mount the apparatus of the present invention on a compact camera, and a solid-state image pickup apparatus for autofocus with low power consumption can be realized. Note that the present invention can be applied not only in the case of the CMOS sensor but also in the case of, for example, CCD, BASIS, SIT, CMD, or AMI sensor.

Second Embodiment

Figures 8, 8A:
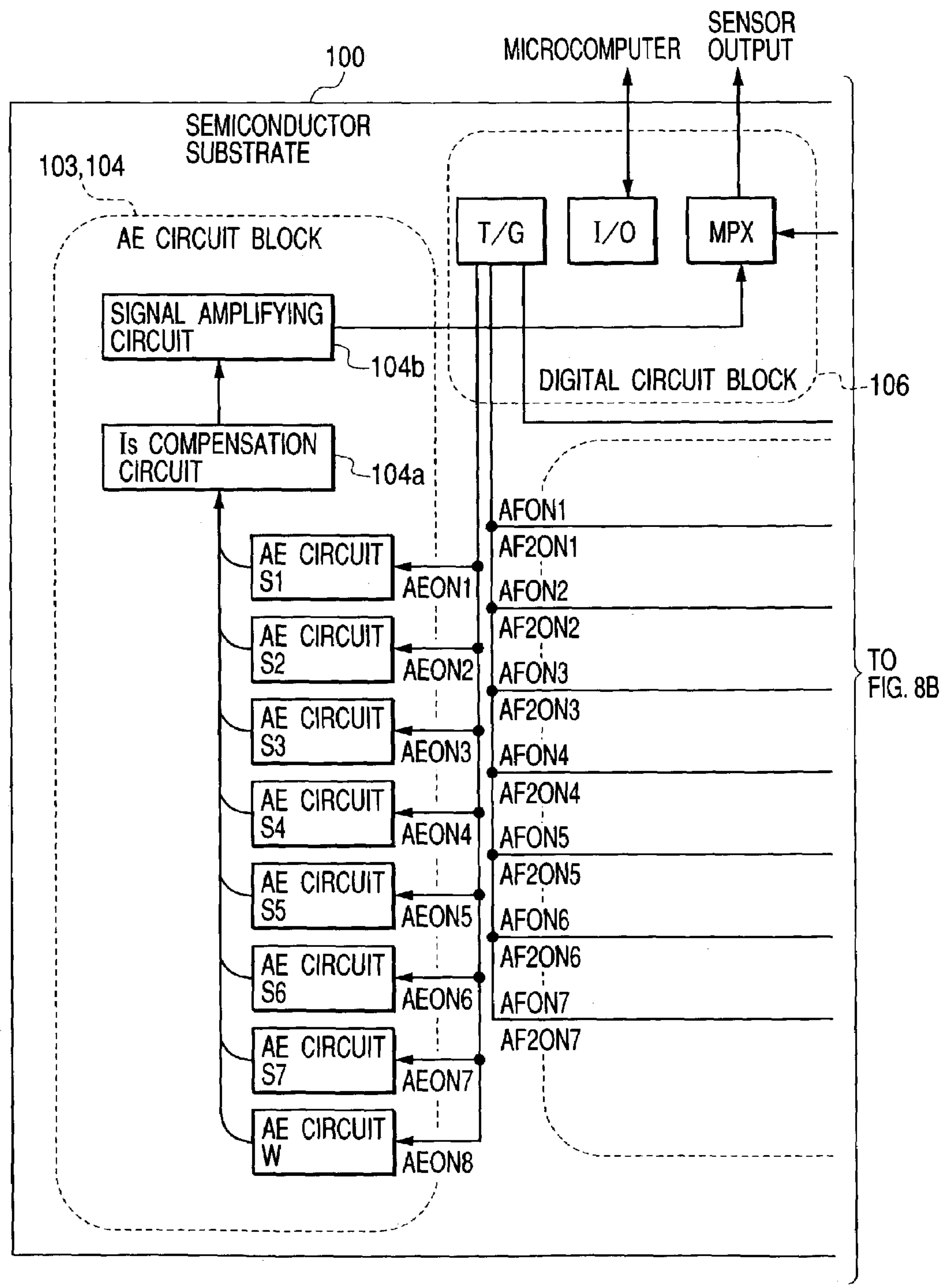
FIG. 8 is comprised of FIGS. 8A and 8B illustrating a block diagram showing a structure of a second embodiment of the present invention.
Figure 8B:
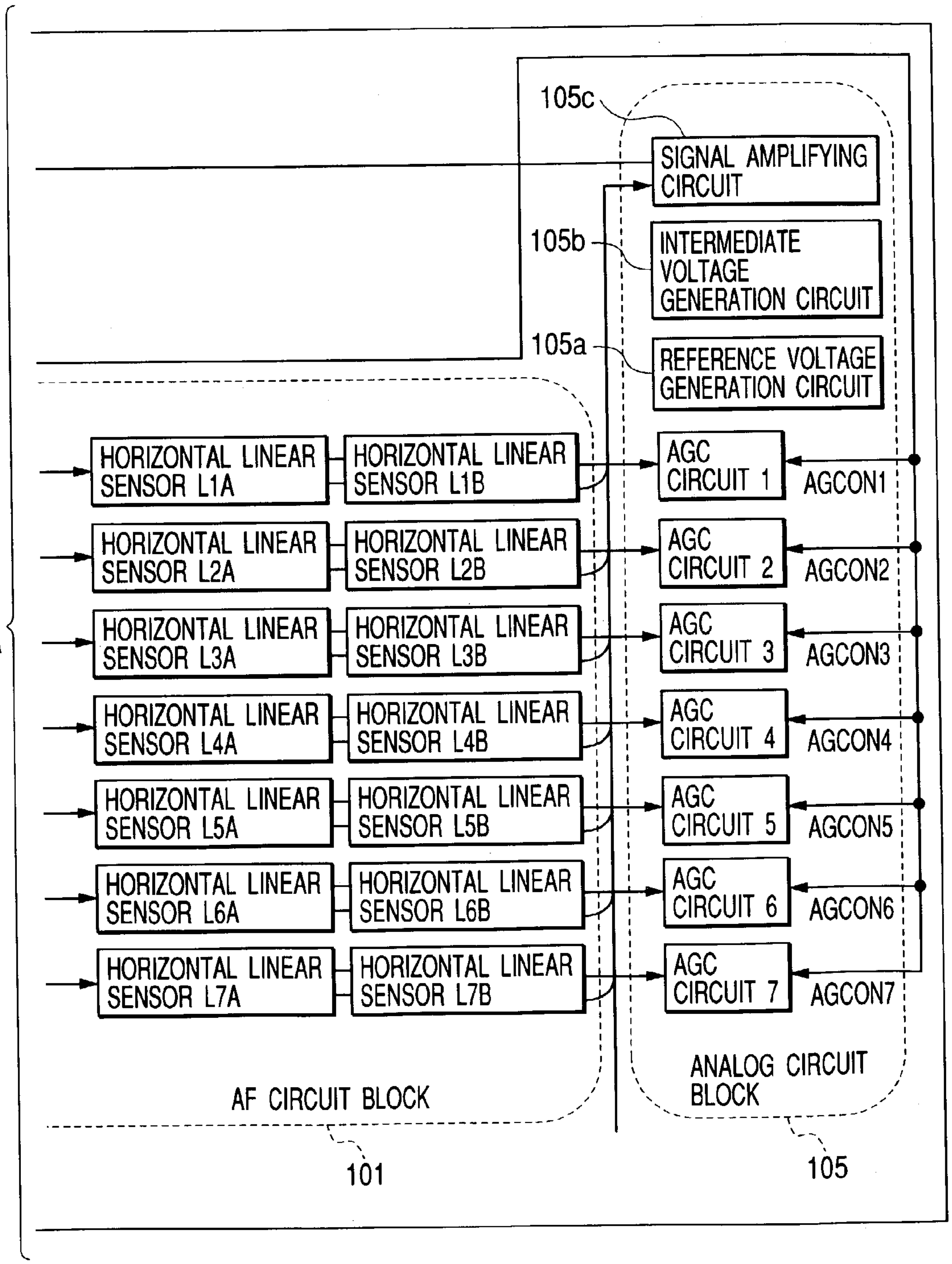
Figure 9:
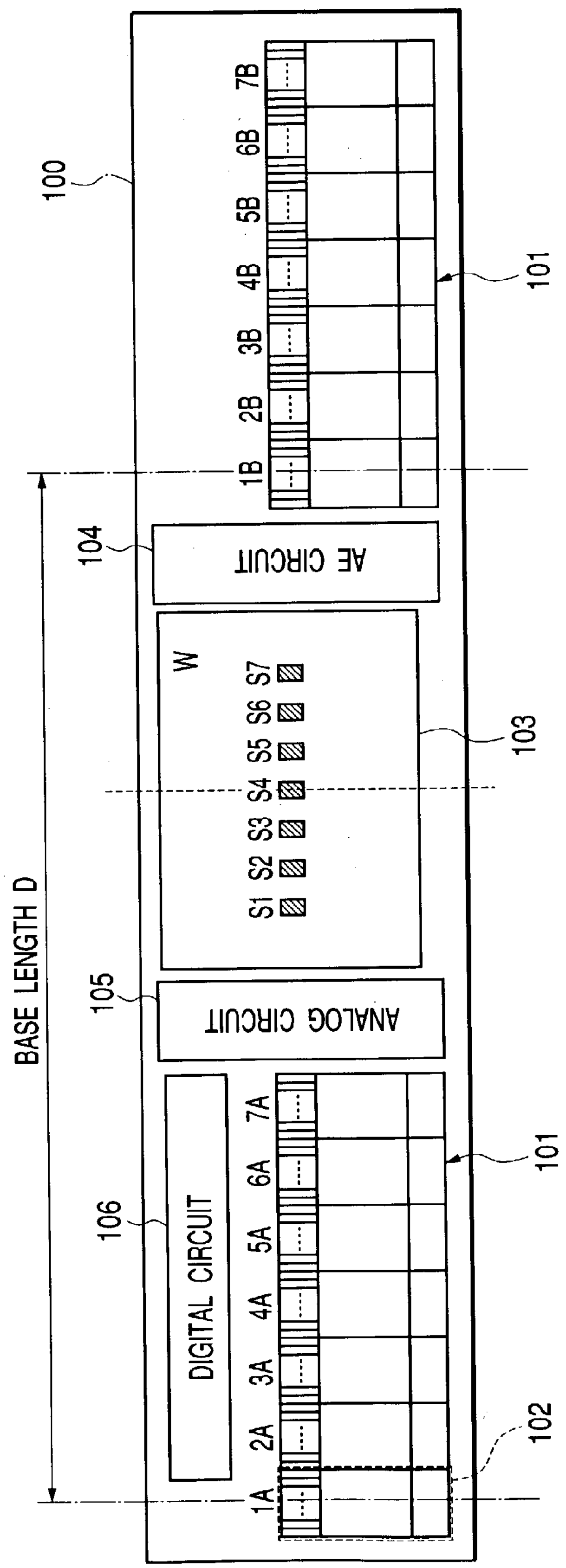
FIG. 9 is a layout plan view of the second embodiment of the present invention.

FIGS. 8A and 8B is a diagram showing a second embodiment of the solid-state image pickup apparatus for photometry and distance measurement of the present invention, and FIG. 9 is a layout plan view thereof. In this embodiment, the number of divisions of an AE sensor is made fewer than that of the first embodiment. That is, the AE sensor is constituted with an AE sensor circuit for entire photometry W and seven AE sensor circuits for spot photometry S1 to S7. Reference symbol W in an AE sensor photodiode area 103 shown in FIG. 9 corresponds to a photodiode of the AE sensor circuit for overall photometry W, and symbols S1 to S7 correspond to photodiodes of the AE sensor circuits for spot photometry S1 to S7, respectively. The other components are configured in the same manner as those in the first embodiment shown in FIGS. 1A and 1B.

Table 3 shows a relationship between zoom ranges (wide-angle range, normal range, and telephoto range) of a photographing lens and operated AF sensors and AE sensors in the second embodiment.

TABLE 3

| | AF Sensor | | | | | | | AE Sensor | | | | | | | |
|---|---|---|---|---|---|---|---|---|---|---|---|---|---|---|---|
| Zoom ranges | L1 | L2 | L3 | L4 | L5 | L6 | L7 | S1 | S2 | S3 | S4 | S5 | S6 | S7 | W |
| (1) Wide-angle range | ○ | ○ | ○ | ○ | ○ | ○ | ○ | ○ | ○ | ○ | ○ | ○ | ○ | ○ | ○ |
| (2) Normal range | — | ○ | ○ | ○ | ○ | ○ | — | — | ○ | ○ | ○ | ○ | ○ | — | ○ |
| (3) Telephoto range | — | — | ○ | ○ | ○ | — | — | — | — | ○ | ○ | ○ | — | — | ○ |

First, in the wide-angle range photographing, all the AE sensors (eight areas) and AF sensors (seven points) are operated to perform photometry and distance measurement. In the normal range photographing, only the AE sensors of S2 to S6 and W (six areas) and the AF sensors of L2 to L6 (five points) are operated to perform photometry and distance measurement. In the telephoto range photographing, only the AE sensors of S3 to S5 and W (four areas) and the AF sensors of L3 to L5 (three points) are operated to perform photometry and distance measurement. Selection between operation and non-operation of the AF sensors and the AE sensors is performed according to a control signal from the T/G circuit as in the first embodiment. In addition, a selection operation of the AGC circuits is performed in association with operation and non-operation of the AF sensor circuits.

As described above, in this embodiment, as in the first embodiment, only the necessary AF sensor circuits and AE sensor circuits among the plurality of AF sensor circuits and AE sensor circuits are brought into the operating state, and the other AF sensor circuits and AE sensor circuits are brought into the non-operating state by turning off constant-current sources thereof, whereby current consumption can be reduced significantly. In addition, since the number of AE sensors is reduced, the structure of the solid-state image pickup apparatus can be simplified and power consumption can be further reduced.

Third Embodiment

Next, a third embodiment of the present invention will be described. In the third embodiment, operating AF sensors and AE sensors are different with respect to zoom ranges (wide-angle range, normal range, and telephoto range) as compared with the first embodiment. The structure of the apparatus is the same as that in the first embodiment. Table 4 shows a relationship between the zoom ranges and the operated AF sensors, and Table 5 shows a relationship between the zoom ranges and the operated AE sensors.

TABLE 4

| | AF Sensor | | | | | | |
|---|---|---|---|---|---|---|---|
| Zoom ranges | L1 | L2 | L3 | L4 | L5 | L6 | L7 |
| (1) Wide-angle range | ○ | — | — | ○ | — | — | ○ |
| (2) Normal range | — | ○ | — | ○ | — | ○ | — |
| (3) Telephoto range | — | — | ○ | ○ | ○ | — | — |

TABLE 5

| Zoom ranges | AE Sensor | | | | | | | | | |
|---|---|---|---|---|---|---|---|---|---|---|
| | S1 | S2 | S3 | S4 | S5 | S6 | S7 | W1,W2,W3,W4 | M1,M2,M3,M4 | T |
| (1) Wide-angle range | ○ | — | — | ○ | — | — | ○ | ○ | ○ | ○ |
| (2) Normal range | — | ○ | — | ○ | — | ○ | — | — | ○ | ○ |
| (3) Telephoto range | — | — | ○ | ○ | ○ | — | — | — | — | ○ |

First, in the case of the wide-angle range, the AF sensors of L1, L4, and L7 and the AE sensors of S1, S4, S7, W1 to W4, M1 to M4, and T are used. In the normal range, the AF sensors of L2, L4, and L6 and the AE sensors of S2, S4, S6, M1 to M4, and T are used. In the telephoto range, the AF sensors of L3 to L5 and the AE sensors of S3 to S5 and T are used. Selection between operation and non-operation of the AF sensors and the AE sensors is performed according to a control signal from the T/G circuit as in the first embodiment. In addition, a selection operation of the AGC circuits is performed in association with operation and non-operation of the AF sensor circuits as in the first embodiment.

This embodiment is characterized in that three-point distance measurement is always performed by using only three blocks among seven blocks of AF sensor circuits. Consequently, although the number of distance measurement points at the time of wide-angle photographing decreases, current consumption can be further reduced as compared with the first embodiment. In addition, current consumption can also be reduced by using only a part of the AE sensors rather than using all the AE sensors. Therefore, a compact camera with a long battery life can be realized by using the solid-state image pickup apparatus of this embodiment in a compact camera of a popular class that does not require a large number of distance measurement points.

In the above-mentioned first to third embodiments, the solid-state image pickup apparatus may have, other than a structure in which a current is completely cut off in the non-operating state, a structure in which in the non-operating state a current is supplied in an amount smaller than that in the operating state.

Fourth Embodiment

Figure 10:
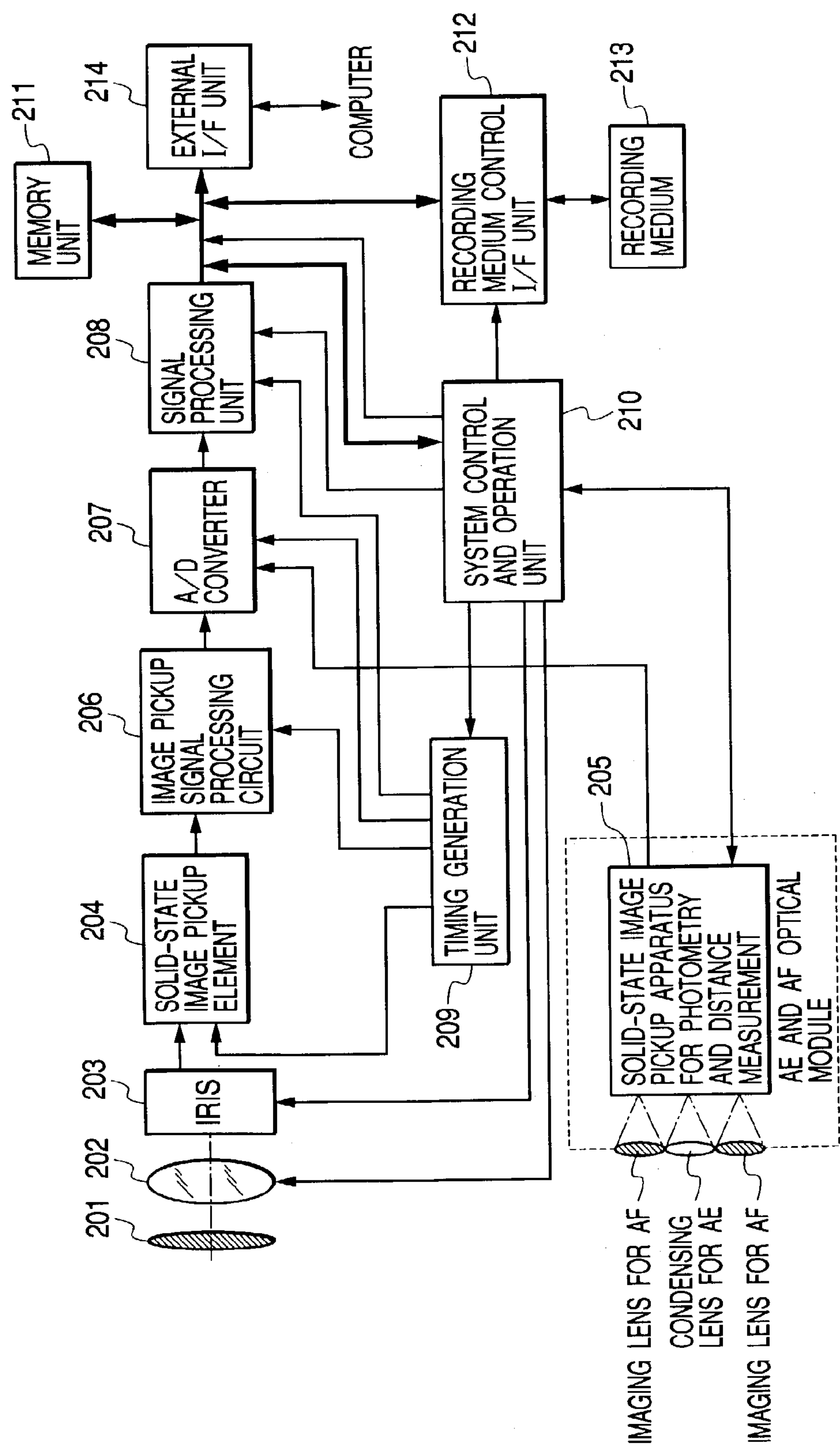
FIG. 10 is a block diagram showing an embodiment of an image pickup apparatus using the solid-state image pickup apparatus for photometry and distance measurement of the present invention.
Figure 11:
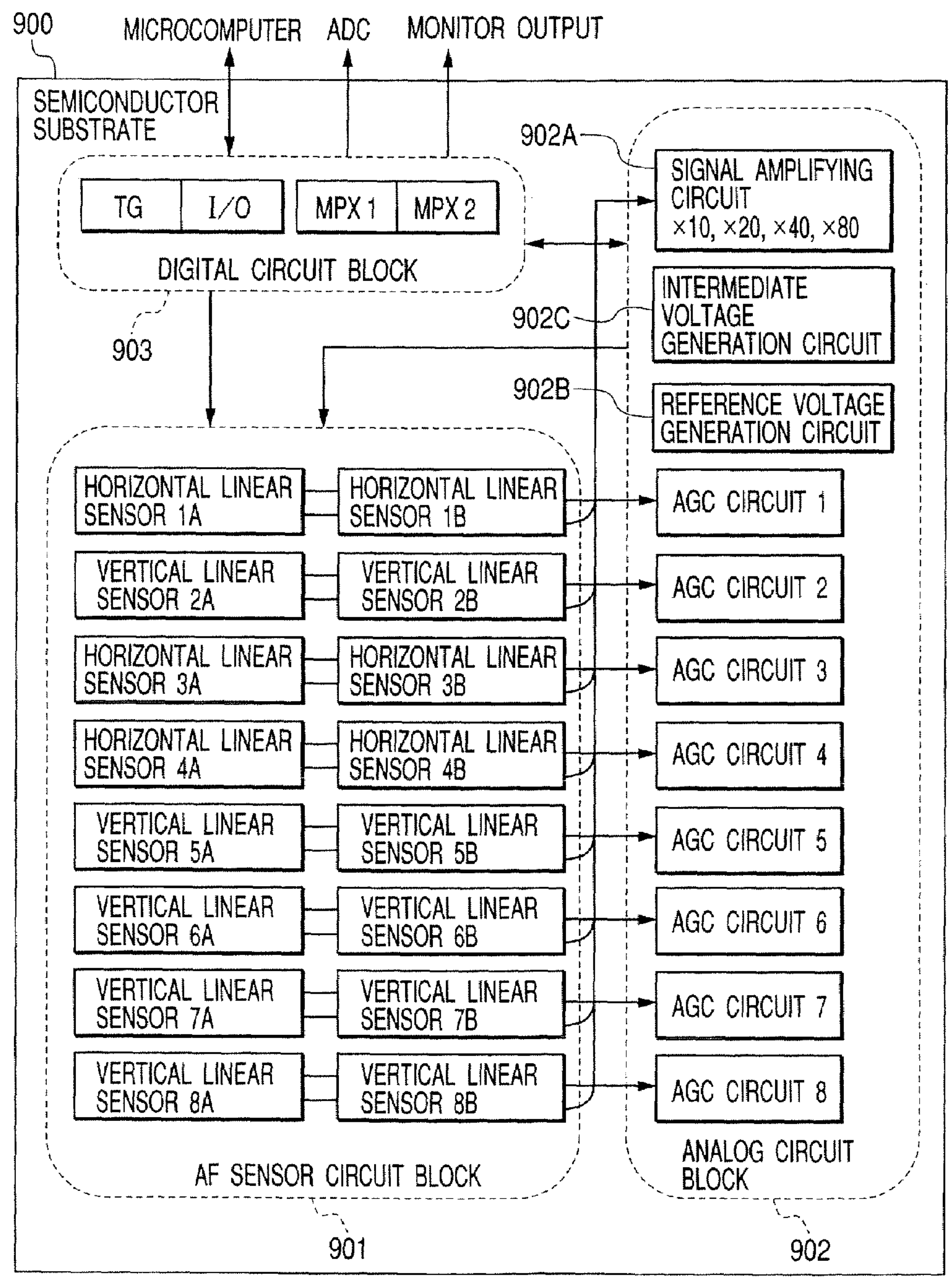
FIG. 11 is a block diagram showing an autofocus sensor for multipoint distance measurement of a conventional example.

Next, an image pickup apparatus using the solid-state image pickup apparatus having the photometry circuit blocks and the distance measurement circuit blocks described in the first to third embodiments will be described. FIG. 10 is a block diagram showing an embodiment in the case in which the solid-state image pickup element for describing the fourth embodiment is used in a lens shutter digital compact camera (image pickup apparatus). In the figure, reference numeral 201 denotes a barrier serving as both a protect for a lens and a main switch; 202, a lens for imaging an optical image of an object on a solid-state image pickup element 204; 203, an iris for varying an amount of light that passes through the lens 202; and 204, a solid-state image pickup element for capturing an object image thus imaged by the lens 202 as an image signal.

In addition, reference numeral 205 denotes the solid-state image pickup apparatus for photometry and distance measurement described in the first to third embodiments. Here, for example, the solid-state image pickup apparatus for photometry and distance measurement of the embodiment shown in FIGS. 1A and 1B is used. Reference numeral 206 denotes an image pickup signal processing circuit for processing an image pickup signal outputted from the solid-state image pickup element. Reference numeral 207 denotes an A/D converter for analog-digital converting an image signal, a photometry signal, and a distance measurement signal outputted from the solid-state image pickup element 204 or the solid-state image pickup apparatus 205; 208, a signal processing unit for performing various kinds of correction and data compression on the image data outputted from the A/D converter 207; 209, a timing generation unit for outputting various timing signals to the solid-sate image pickup element 204, the image pickup signal processing circuit 206, the A/D converter 207, the signal processing unit 208, and the like; 210 a system control and operation unit for performing various arithmetic operations and controlling the entire camera; and 211, a memory unit for temporarily storing image data.

Moreover, reference numeral 212 denotes an interface unit for recording image data in and reading out image data from a recording medium; 213, a detachable recording medium such as a semiconductor memory in which image data is recorded and from which image data is read out; and 214, an interface unit for communicating with an external computer or the like.

Next, an operation at the time of performing photography with such a lens shutter digital compact camera will be described. When the barrier 201 is opened, a main power supply is turned on, a power supply of a control system is turned on next, and then a power supply of an image pickup system circuit such as the A/D converter 207 is turned on.

An arithmetic operation of a distance to an object is performed in the system control and operation unit 210 with a trigonometrical distance measurement method based on a signal outputted from an AF sensor circuit block of the solid-state image pickup apparatus 205. Thereafter, an extension amount of the lens 202 is calculated, and the lens 202 is driven to a predetermined position to be focused.

Subsequently, in order to control an amount of exposure, the signal outputted from an AE sensor of the solid-state image pickup apparatus 205 is converted by the A/D converter 207 and then inputted in the signal processing unit 208. An arithmetic operation of exposure is performed in the system control and operation unit 210 based on data of the signal. Brightness is judged according to a result of this photometry, and the system control and operation unit 210 adjusts the iris 203 and a shutter speed according to the results of the judgment.

Thereafter, main exposure is commenced in the solid-state image pickup element 204 after exposure conditions are established. When the exposure is finished, an image signal outputted from the solid-state image pickup element 204 is A/D converted in the A/D converter 207 and written in the memory unit 211 by the system control and operation unit 210 through the signal processing unit 208. Thereafter, data accumulated in the memory unit 211 is recorded in the detachable recording medium 213 through the recording medium control I/F unit 212 by the control of the system control and operation unit 210. In addition, the data may be inputted in a computer or the like directly through the external I/F unit 214. Note that the solid-state image pickup apparatus for photometry and distance measurement of the present invention can be used not only in a digital compact camera but also in a silver salt camera and the like. In addition, the same effect is obtained also when it is used in a single-lens reflex camera.

As described above, only necessary photometry circuits and distance measurement circuits are operated from among the plurality of photometry circuits and the plurality of distance measurement circuits, and unnecessary photometry circuits and distance measurement circuits are brought into the non-operating state, whereby current consumption can be reduced significantly, and a solid-state image pickup apparatus for photometry and distance measurement with low power consumption can be realized. In addition, operation and non-operation of the accumulation time control circuit are controlled according to operation and non-operation of the distance measurement circuit, whereby current consumption can be further reduced.

Therefore, the solid-state image pickup apparatus for photometry and distance measurement described above can be suitably used in a compact camera, and an autofocus compact camera capable of performing multi-point distance measurement can be realized. In addition, an autofocus compact camera that has a longer battery life and is more user friendly than that of the prior art can be realized. Many widely different embodiments of the present invention may be constructed without departing from the spirit and scope of the present invention. It should be understood that the present invention is not limited to the specific embodiments described in the specification, except as defined in the appended claims.

What is claimed is:

1. A sensor device for AE/AF comprising:

a first photoelectric conversion circuit which has a photoelectric conversion area and is used for performing focus adjustment;

a second photoelectric conversion circuit which has a photoelectric conversion area and is used for performing exposure amount adjustment; and a control circuit which controls a power supply such that power is supplied to said first photoelectric conversion circuit and said second photoelectric conversion circuit independently, wherein said first photoelectric conversion circuit and said second photoelectric conversion circuit are formed on a same semiconductor substrate, wherein each of said first and second photoelectric conversion circuits includes a current blocking circuit which blocks a current, and said control circuit controls said current blocking circuit, and wherein said current blocking circuit is a part of a differential amplifying circuit.

2. A sensor device for AE/AF comprising:

a first photoelectric conversion circuit which has a photoelectric conversion area and is used for performing focus adjustment;

a second photoelectric conversion circuit which has a photoelectric conversion area and is used for performing exposure amount adjustment; and a control circuit which controls a power supply such that power is supplied to said first photoelectric conversion circuit and said second photoelectric conversion circuit independently, and wherein said first photoelectric conversion circuit and said second photoelectric conversion circuit are formed on a same semiconductor substrate, and further comprising an accumulation time control circuit which controls an accumulation time of charges in the photoelectric conversion area included in said first photoelectric conversion circuit, wherein said accumulation time control circuit is formed on the same semiconductor substrate on which said first photoelectric conversion circuit and said second photoelectric conversion circuit are formed, and wherein said control circuit controls the power supply such that power is supply such that power is supplied to said first photoelectric conversion circuit, said second photoelectric conversion circuit, and said accumulation time control circuit independently.

wherein each of said first and second photoelectric conversion circuits includes a current blocking circuit which blocks a current, and said control circuit controls said current blocking circuit, and wherein said current blocking circuit is a part of a differential amplifying circuit.

3. A sensor device for AE/AF comprising:

first and second photoelectric conversion circuits, each of which includes a photoelectric conversion area; and a control circuit which, according to an operation of a zoom lens for magnifying and reducing an object image to be picked up, switches between a mode in which power is not supplied to said first photoelectric conversion circuit and power is supplied to said second photoelectric conversion circuit and a mode in which power is supplied to said first and second photoelectric conversion circuits.

4. A sensor device for AE/AF according to claim 3, wherein each of said first and second photoelectric conversion circuits includes a current blocking circuit which blocks a current, and said control circuit controls said current blocking circuit.

5. A sensor device for AE/AF according to claim 4, wherein each of said first and second photoelectric conversion circuits includes a current blocking circuit which blocks a current, and said control circuit controls said current blocking circuit.

6. A sensor device for AE/AF according to claim 3, further comprising:

an image pickup element which picks up an object image; and an adjustment circuit which performs focus adjustment based on a signal from said first photoelectric conversion circuit and performs exposure amount adjustment based on a signal from said second photoelectric conversion circuit.

7. A sensor device for AE/AF according to claim 3, further comprising:

first and second photoelectric conversion circuits, each of which includes a photoelectric conversion area and a logarithmic compression circuit;

third and fourth photoelectric conversion circuits provided on one side of said first and second photoelectric conversion circuits, each of which has a plurality of photoelectric conversion areas and a reading-out circuit for reading out peak signals of the plurality of photoelectric conversion areas;

fifth and sixth photoelectric conversion circuits provided on the other side of said the first and second photoelectric conversion circuits, each of which has a plurality of photoelectric conversion areas and a reading-out circuit for reading out peak signals of the plurality of photoelectric conversion areas; and a control circuit which controls a power supply such that power is not supplied to said first, third, and fifth photoelectric conversion circuits and power is supplied to said second, fourth, and sixth photoelectric conversion circuits, wherein said first to sixth photoelectric conversion circuits are formed on a same semiconductor substrate.

8. A sensor device for AE/AF according to claim 7, wherein each of said first to sixth photoelectric conversion circuits includes a current blocking circuit which blocks a current, and said control circuit controls said current blocking circuit.

9. A sensor device for AE/AF according to claim 8, wherein said current blocking circuit is a part of a differential amplifying circuit.

10. A sensor device for AE/AF according to claim 7, further comprising:

an image pickup element which picks up an object image; and an adjustment circuit which performs exposure amount adjustment based on a signal from said first and second photoelectric conversion circuits and performs focus adjustment based on a signal from said third to sixth photoelectric conversion circuits.

11. A sensor device for AE/AF comprising:

a first photoelectric conversion circuit including a photoelectric conversion area and a logarithmic compression circuit;

a second photoelectric conversion circuit that is provided on one side of said first photoelectric conversion circuit and has a plurality of photoelectric conversion areas and a reading-out circuit for reading out peak signals of the plurality of photoelectric conversion area; and a control circuit for controlling a power supply such that power is supplied to said first photoelectric conversion circuit and said second photoelectric conversion circuit independently, wherein said first and second photoelectric conversion circuits are formed on a same semiconductor substrate, wherein each of said first and second photoelectric conversion circuits includes a current blocking circuit which blocks a current, and said control circuit controls said current blocking circuit, and wherein said current blocking circuit is part of a differential amplifying circuit.

* * * * *

UNITED STATES PATENT AND TRADEMARK OFFICE

CERTIFICATE OF CORRECTION

PATENT NO. : 7,221,400 B2
APPLICATION NO. : 10/347875
DATED : May 22, 2007
INVENTOR(S) : Hidekazu Takahashi et al.

It is certified that error appears in the above-identified patent and that said Letters Patent is hereby corrected as shown below:

ON TITLE PAGE ITEM [54] TITLE:

Title, "SENSOR" should read --A SENSOR--.

COLUMN 1:

Line 1, "SENSOR" should read --A SENSOR--.

COLUMN 12:

Line 20, "solid-sate" should read --solid-state--.

COLUMN 14:

Line 13, "such that power is supply" should be deleted; and
Line 16, "independently." should read --independently,--.

Signed and Sealed this

Ninth Day of September, 2008

JON W. DUDAS
*Director of the United States Patent and Trademark Office*